(12) United States Patent
Jamond et al.

(10) Patent No.: US 9,674,089 B2
(45) Date of Patent: Jun. 6, 2017

(54) METHODS AND DEVICE FOR PROCESSING DIGITAL DATA FRAMES AND TRANSPORT FRAMES FOR REDUCTION OF TRANSPORT BANDWIDTH

(71) Applicant: Alcatel Lucent, Boulogne Billancourt (FR)

(72) Inventors: Jean-Francois Jamond, Nozay (FR); Emmanuel Froger, Nozay (FR); Olivier Klein, Nozay (FR); Olivier Thomann, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/413,808

(22) PCT Filed: Jun. 7, 2013

(86) PCT No.: PCT/EP2013/061815
§ 371 (c)(1),
(2) Date: Jan. 9, 2015

(87) PCT Pub. No.: WO2014/009072
PCT Pub. Date: Jan. 16, 2014

(65) Prior Publication Data
US 2015/0207740 A1    Jul. 23, 2015

(30) Foreign Application Priority Data

Jul. 9, 2012  (EP) .................................. 12175600

(51) Int. Cl.
*H04L 12/43*    (2006.01)
*H04L 12/28*    (2006.01)
(Continued)

(52) U.S. Cl.
CPC ............. *H04L 47/12* (2013.01); *H04B 10/27* (2013.01); *H04J 3/1652* (2013.01); *H04L 69/04* (2013.01)

(58) Field of Classification Search
USPC ...................................... 398/58, 43
See application file for complete search history.

(56) References Cited

U.S. PATENT DOCUMENTS

| 6,865,188 B1* | 3/2005 | Stirling | H04L 12/43 370/460 |
| 7,042,904 B2* | 5/2006 | Kamiya | H04J 3/1617 370/466 |

(Continued)

FOREIGN PATENT DOCUMENTS

| EP | 2 373 116 A1 | 10/2011 |
| JP | 2003-188843 A | 7/2003 |

(Continued)

OTHER PUBLICATIONS

Common Public Radio Interface (CPRI); Interface Specification V5.0 (Sep. 21, 2011).

(Continued)

*Primary Examiner* — Oommen Jacob
(74) *Attorney, Agent, or Firm* — Fay Sharpe, LLP

(57) ABSTRACT

A device (D1) is intended for processing digital data frames to be transmitted by a transport network (TN), and comprises i) a first processing means (PM1) comprising ports for receiving digital data frames and arranged for downsizing, then compressing, if necessary, and then compacting each one of these received digital data frames to produce reduced digital data frames, ii) a second processing means (PM2) arranged for aggregating at least some of these reduced digital data frames together according to aggregation information to produce frame groups, and iii) a third processing means (PM3) arranged for grouping these frame groups (Continued)

together with a group descriptor, defining initial arrangements of the digital data frames, according to grouping information, to produce a transport frame to be transmitted by the transport network (TN).

14 Claims, 4 Drawing Sheets

(51) Int. Cl.
  *H04J 3/16* (2006.01)
  *H04L 12/801* (2013.01)
  *H04L 29/06* (2006.01)
  *H04B 10/27* (2013.01)

(56) References Cited

U.S. PATENT DOCUMENTS

| | | | | |
|---|---|---|---|---|
| 7,489,688 B2* | 2/2009 | Giesberts | ............... | H04L 29/06 370/392 |
| 7,653,083 B2* | 1/2010 | Liu | ............... | H04J 3/1617 370/229 |
| 7,656,897 B2* | 2/2010 | Liu | ............... | H04J 3/1617 370/467 |
| 2001/0005828 A1* | 6/2001 | Yamaji | ............. | G11B 20/00086 704/500 |
| 2007/0116046 A1* | 5/2007 | Liu | ............... | H04J 3/1617 370/466 |
| 2007/0260965 A1* | 11/2007 | Schmidt | ............... | H04L 1/0045 714/799 |
| 2008/0144553 A1* | 6/2008 | Shao | .................... | H04W 28/06 370/310 |
| 2009/0080452 A1* | 3/2009 | Ra | ........................ | H04L 45/00 370/419 |
| 2009/0290632 A1* | 11/2009 | Wegener | ............... | H03M 7/30 375/240 |
| 2009/0323716 A1* | 12/2009 | Chintalapudi | .... | H04W 74/0841 370/461 |
| 2010/0172255 A1* | 7/2010 | Cook | .................. | H04L 12/2697 370/252 |
| 2011/0013543 A1* | 1/2011 | Lim | .................... | H04W 72/042 370/281 |
| 2015/0207740 A1* | 7/2015 | Jamond | .................. | H04L 69/04 398/58 |

FOREIGN PATENT DOCUMENTS

| | | |
|---|---|---|
| JP | 2007-124608 A | 5/2007 |
| JP | 2008-506321 A | 2/2008 |
| KR | 10-2005-0065387 | 6/2005 |
| WO | WO 2009/151893 A2 | 12/2009 |

OTHER PUBLICATIONS

International Search Report for PCT/EP2013/061815 dated Jul. 23, 2013.

* cited by examiner

| octet | 000 | 001 | 010 | 011 | 100 | 101 | 110 | 111 |
|---|---|---|---|---|---|---|---|---|
| client byte stream | D1 | K28.5 | D2 | D3 | 8B/10B Error | D4 | D5 | D6 |

| octet | L | 000 | 001 | 010 | 011 | 100 | 101 | 110 | 111 |
|---|---|---|---|---|---|---|---|---|---|
| 65B code stream | 1 | 1,001, K285 | 0,100, KERR | D1 | D2 | D3 | D4 | D5 | D6 |

METHODS AND DEVICE FOR PROCESSING DIGITAL DATA FRAMES AND TRANSPORT FRAMES FOR REDUCTION OF TRANSPORT BANDWIDTH

TECHNICAL FIELD

The present invention relates to telecommunications, and more precisely to process of digital data frames to be transmitted by a transport network and of transport frames that have been transmitted by a transport network.

BACKGROUND OF THE INVENTION

Many telecommunication systems comprises base band units (or BBUs), also named remote equipment controllers (or RECs) in the CPRI (Common Public Radio Interface) terminology, that are coupled to remote radio-heads (or RRHs), also named remote equipments (or REs) in the CPRI terminology, via a (digital) transport network. Digitised base band complex in-phase (I) and quadrature phase (Q) samples defining data are transported over this transport network.

More precisely, these IQ samples are into (AxC) containers of digital data frames, for instance of the CPRI type and generated by the remote equipment controllers and the remote equipments. These digital data frames are processed before being integrated into transport frames that a transport network is able to transport. This process usually consists in a bandwidth requirement optimisation and a rate adaptation between the IQ sampling rate and the transport network rate. For instance, in case where the transport network is an optical transport network (or OTN), the CPRI digital data frames are encapsulated into transport frames named optical transport units (or OTUs).

The OTN may be, for example, a Passive Optical Network (PON), for example a 10 Gigabit Passive Optical Network (10GPON), a Wave Division Multiplex Passive Optical Network (WDM PON), a WDM overlay to a 10GPON, a CDWM optical ring, or a DWDM optical ring.

In an optical transport network, optical fibres can be used as point-to-point links between remote radio-heads and base band units. Typically, when a base band unit controls N remote radio-heads, there may be N optical fibres coupling this base band unit to these remote radio-heads.

As it is not always possible to daisy-chain the remote radio-heads and to share the physical links used, more and more dedicated links are required and the available bandwidth is not used efficiently.

Moreover, the CPRI bit stream is carried as a constant bit rate stream, and there is no solution that optimizes either the line coding and/or the bandwidth required to carry the payloads of the CPRI digital data frames and that enables aggregation and multiplexing of CPRI links.

SUMMARY OF THE INVENTION

So, an objective of the invention is to improve the situation, and notably to allow links aggregation and multiplexing in an efficient and transparent manner (for instance with a small overhead and/or with adaptation of bandwidth requirements to the actual link usage but not to its maximum capacity).

More precisely, the invention provides a first method, intended for processing digital data frames to be transmitted by a transport network, and comprising:

a step (i) during which these digital data frames are downsized, then compressed if necessary and then compacted to produce reduced digital data frames, a step (ii) during which at least some of these reduced digital data frames are aggregated together according to aggregation information to produce frame groups, and a step (iii) during which these frame groups are grouped together with a group descriptor, defining initial arrangements of the digital data frames, according to grouping information, to produce a transport frame to be transmitted by the transport network.

The first method according to the invention may include additional characteristics considered separately or combined, and notably:

the downsizing may comprise reducing the line coding overhead of each digital data frame, while keeping errors of transmission;

the optional compression may comprise scaling blocks of samples by a scaling factor and quantising these scaled blocks of samples to produce compressed samples;

the compacting may comprise clearing from unused data bytes each one of the digital data frames;

in step (i), in case where the digital data frames have been encoded according to a 8B/10B line coding, one may transform each one of these digital data frames into a couple of 8 data bits plus 2 control bits (8+2B);

in step (ii) one may apply a 64B/65B encoding to data containers contained into the frame groups before aggregating them into the transport frame;

the digital data frames may be common public radio interface (CPRI) data frames;

the transport frame may be an optical data unit configured for transport by an optical transport network (OTN).

The invention also provides a second method, intended for processing a transport frame transmitted by a transport network, and comprising:

a step (a) during which, after having received a transport frame produced by the first method above introduced, one de-groups frame groups it comprises, a step (b) during which one de-aggregates each of these frame groups to get reduced digital data frames they comprise, and a step (c) during which one un-compacts, then de-compresses (if compressed), and then upsizes each one of these reduced digital data frames according to information contained into a group descriptor of the transport frame to get digital data frames.

The second method according to the invention may include additional characteristics considered separately or combined, and notably:

in step (b), in case where the de-grouped frame groups contain data containers encoded by means of a 64B/65B encoding, one may apply a 64B/65B decoding to these data containers;

in step (c), in case where the digital data frames are 8+2B digital data frames, one may transform them into 8B/10B digital data frames;

the transport frame may be an optical data unit transported by an optical transport network (OTN);

the digital data frames may be common public radio interface data frames.

The invention also provides a device, intended for processing digital data frames to be transmitted by a transport network, and comprising:

a first processing means comprising ports for receiving digital data frames and arranged for downsizing, then compressing (if needed) and then compacting each one of these received digital data frames to produce reduced digital data frames, a second processing means arranged for aggregating at least some of these reduced digital data frames together according to aggregation information to produce frame groups, and a third processing means arranged for grouping these frame groups together with a group descriptor, defining initial arrangements of the digital data frames, according to grouping information, to produce a transport frame to be transmitted by the transport network.

This third processing means may be arranged, after having received a transport frame, for de-grouping the frame groups it comprises, and this second processing means may be arranged for de-aggregating each of these frame groups to get reduced digital data frames they comprise. Moreover, the first processing means may be arranged for un-compacting, then de-compressing, and then un-downsizing each one of the reduced digital data frames according to information contained into the group descriptor of the transport frame to get digital data frames.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its understanding, if need be.

The invention aims, notably, at offering first and second processing methods, and an associated processing device Di (i=1 or 2), intended for processing digital data frames Fm to be transmitted by a transport network TN and transport frames TF that have been transmitted by a transport network TN.

In the following description it will be considered that the transport network TN is an optical transport network (OTN). For instance, it may be a Passive Optical Network (or PON—for instance a 10 Gigabit Passive Optical Network (10GPON)), a Wave Division Multiplex Passive Optical Network (WDM PON), a WDM overlay to a 10GPON, a CDWM optical ring, or a DWDM optical ring. But the invention is not limited to this type of transport network (point to point wireless connection).

Figure 1:
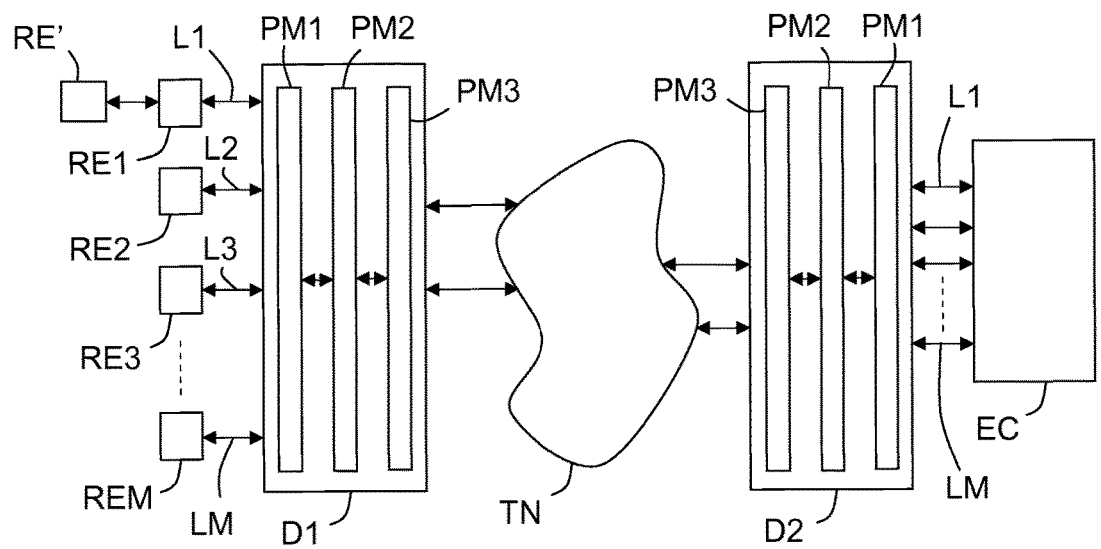
FIG. 1 schematically and functionally illustrates an example of telecommunication system comprising two processing devices according to the invention, FIG. 2 schematically and functionally illustrates an example of embodiment of a processing device according to the invention, FIG. 3 schematically illustrates a first example of a CPRI digital data frame before any processing, FIG. 4 schematically illustrates the CPRI digital data frame of FIG. 3 after downsizing and compression, FIG. 5 schematically illustrates the CPRI digital data frame of FIG. 4 after compacting (which forms a reduced CPRI digital data frame), FIG. 6 schematically illustrates a second example of a reduced CPRI digital data frame (i.e. after processing (downsizing, compression and compacting)), FIG. 7 schematically illustrates a third example of a reduced CPRI digital data frame, FIG. 8 schematically illustrates an example of frame group comprising the reduced CPRI digital data frames of FIGS. 5 and 6, FIG. 9 schematically illustrates an example of transport frame comprising the frame group of FIG. 8 and other frame groups, FIG. 10 schematically illustrates the CPRI digital data frame of FIG. 4 after an auxiliary transformation into a 8+2B frame, and FIG. 11 schematically illustrates an example of a corresponding 64B/65B encoding issued of a 8+2B encoded data frame.

An example of telecommunication system capable of implementing the invention is illustrated in FIG. 1. This (telecommunication) system comprises a transport network TN (here of the OTN type) to which are coupled first D1 and second D2 processing devices according to the invention. The first processing device D1 is coupled to M remote radio-heads (or RRHs) REm (with m=1 to M) through M links Lm. For instance and as illustrated, at least one of these remote radio-heads REm (here RE1) can be also coupled to another remote radio-head RE'. The second processing device D2 is coupled to one or more base band units (or BBUs) EC through at least M links Lm. These processing device Di (i=1 or 2) can be seen as communication interfaces or link aggregators.

The base band unit EC and the remote radio-heads REm are capable of generating and using digital data frames Fm containing (AxC) containers Cn, made of IQ samples (compressed or uncompressed). So they deliver on their respective ports (connected to the links Lm) digital data frames Fm that must be transported by the transport network TN into transport frames TF after processing according to a first method, and they receive on their respective ports digital data frames Fm resulting from processing according to a second method of transport frames TF that have been transported by the transport network TN.

In the following description it will be considered that the digital data frames Fm are CPRI digital data frames. But the invention is not limited to this type of digital data frames. Indeed it also concerns Ethernet frames and HDLC frames, for instance (it could be effectively a packet link encapsulated in a switched link such as an ODU frame). So, the base band unit EC is a remote equipment controller, and the remote radio-heads REm are remote equipments.

The first processing method, according to the invention, comprises three steps (i), (ii) and (iii), which may be implemented by a processing device Di (i=1 or 2).

The first step (i) begins when the device Di receives digital data frames Fm on its ports connected respectively to the M links Lm.

Figure 3:
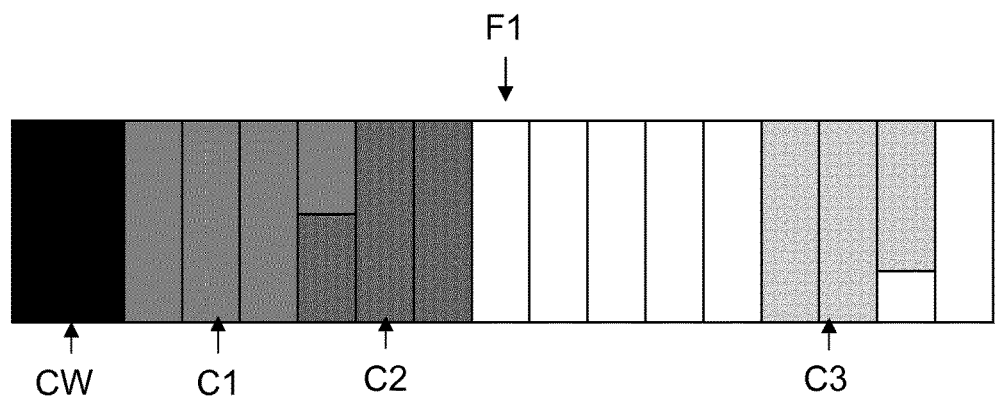

A non-limiting example of a first digital data frame BF1 is illustrated in FIG. 3. In this example, the first digital data frame F1 comprises, notably and classically, a control word CW and a payload DB comprising IQ data contained into AxC containers (here C1, C2 and C3, n=1 to 3) of different sizes.

In this first step (i), downsizing (i.e. removing line code) and compression of the IQ samples, if needed, is performed (FIG. 4) for each digital data frame Fm, and then each frame Fm is compacted (FIG. 5) to produce a reduced digital data frame RFm. Two other examples F2 and F3 of reduced digital data frames are respectively illustrated in FIGS. 6 and 7.

This first step (i) may be carried out by a first processing means PM1 of the (processing) device Di. To this effect, this first processing means PM1 may comprise M sub processing means SM1m respectively connected to the M ports of the device Di that are connected respectively to the M links Lm.

As illustrated, each sub processing means SM1m may comprise a pre-processing means PPM arranged, at least, for downsizing (removal of line code) each digital data frame Fm it receives. For instance, this downsizing may comprise removing overhead of each digital data frame Fm, while keeping errors of transmission by decoding the digital data frame Fm when a digital data frame Fm has been encoded according to a line coding such as a 8B/10B. In this case, for each decoded byte, control bits will be forwarded by the pre-processing means PPM to the other processing means (PM2 and PM3). These control bits will characterize the actual decoded byte: valid data byte, invalid data byte, or special character. These control bits will be used by the 64B/65B encoder.

Figure 4:
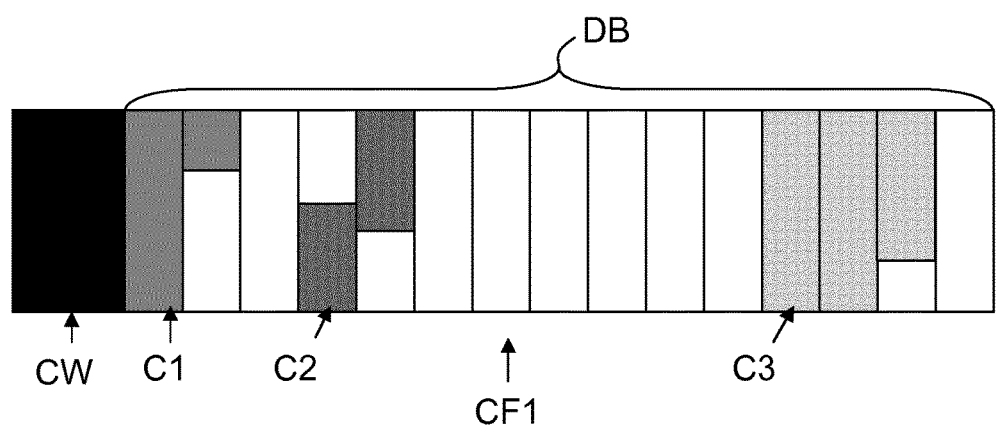

Each sub processing means SM1m may also comprise a size reduction means SRM arranged, at least, for compressing the content of each downsized digital sample container (or block of samples) it receives to produce a compressed digital data frame CFm (see FIG. 4, C1, C2 compressed, C3 unchanged). For instance, this compression may comprise frequency down-sampling, scaling blocks of samples by a scaling factor and quantising these scaled blocks of samples to produce compressed samples and therefore generate a compressed digital data frame CFm.

Figure 5:
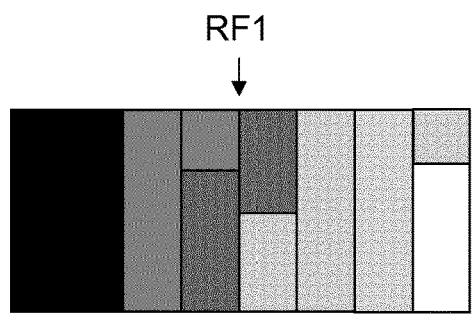
Figure 6:
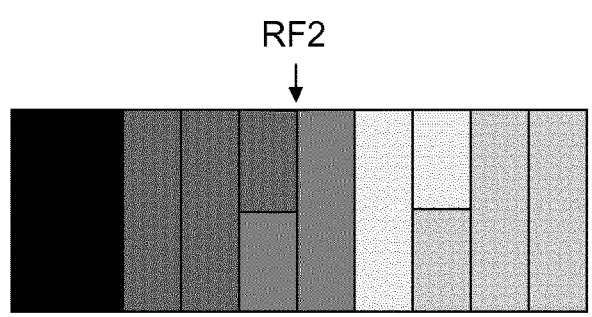
Figure 7:
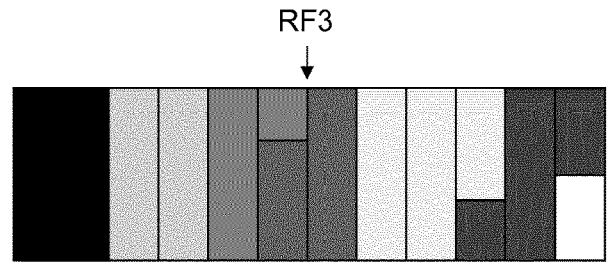

Each sub processing means SM1m may further comprise a packing/unpacking means UPM arranged for compacting (or packing) each compressed digital data frame CFm it receives to produce a reduced digital data frame RFm (see FIG. 5, 6 or 7). For instance, this compacting comprises clearing from unused data bytes in every data frame CFm (rounded to an integer number of bytes), and therefore generates reduced digital data frames RFm.

It is important to note that, when a digital data frame Fm has been encoded according to a 8B/10B (or 8 bits/10 bits) encoding, it can be advantageously transformed into a 8+2B digital data frame after downsizing and before compression. Here, the expression "8+2B" means a couple of 8 bits of data plus 2 control bits characterizing the actual decoded byte: valid data byte, invalid data byte due to transmission error (EI: Error Indicator), or special character (e.g. CPRI Sync byte/K28.5, indicator KCI). These control bits will be forwarded by the pre-processing means PPM to the other processing means (PM2 and PM3) and will be used by the 64B/65B encoder.

CPRI specifications use of 8B/10B line coding because it provides sufficient transition density within the bit stream for the data clock recovery and ensures a good DC (Direct Current) balance (i.e. the ratio of "0" and "1" on the line is the same). Indeed 8B/10B encoding allows to carry special characters and to provide transmission error detection. This is required to not disturb the CPRI layer 1 synchronization procedures (i.e. line rate auto-negotiation and LOS (Loss Of Signal) and LOF (Loss Of Frame) detection).

In the second step (ii) of the first method, at least some of the reduced digital data frames RFm are aggregated together according to aggregation information in order to produce frame groups FGk (k=1 to K or K+1, where K depends on the output bitrate and the choice of K or K+1 depends if or if not the input bitrate is an integer multiple of the output bitrate.

Figure 8:
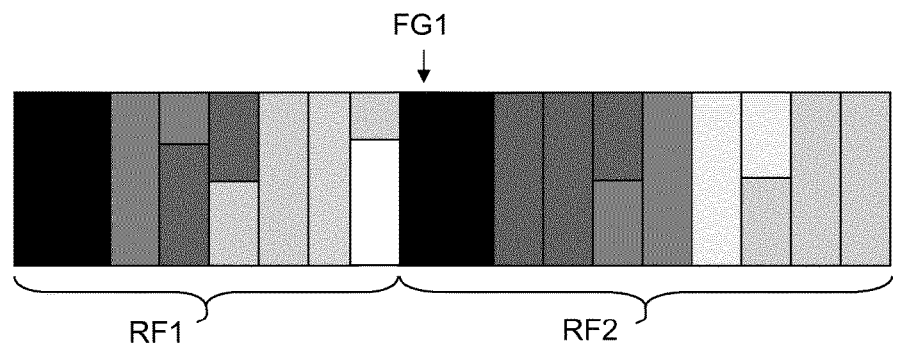

A first example of frame group FG1 is illustrated in FIG. 8. As illustrated, in this first example the frame group FG1 comprises the first RF1 and second RF2 reduced digital data frames illustrated in FIGS. 5 and 6. It is important to note that a frame group FGk may comprise one or more aggregated reduced digital data frames RFm. Each frame group FGk comprises the same set of aggregated reduced digital data frames RFm. The sequence made of K or K+1 frame group FGk is the basic frame sent on the transport network to a common destination device Di through the same physical link.

This second step (ii) may be carried out by a second processing means PM2 of the (processing) device Di. To this effect and as illustrated in FIG. 2, this second processing means PM2 may comprise an aggregation means AM arranged for aggregating together reduced digital data frames RFm it receives to produce a frame group FGk according to grouping information it comprises or to which it has access (see FIG. 8).

Preferably, during the second step (ii) a 64B/65B encoding is applied to the AxC data containers contained into the frame groups FGk before they are aggregated into a transport frame TF.

Figures 10, 11:
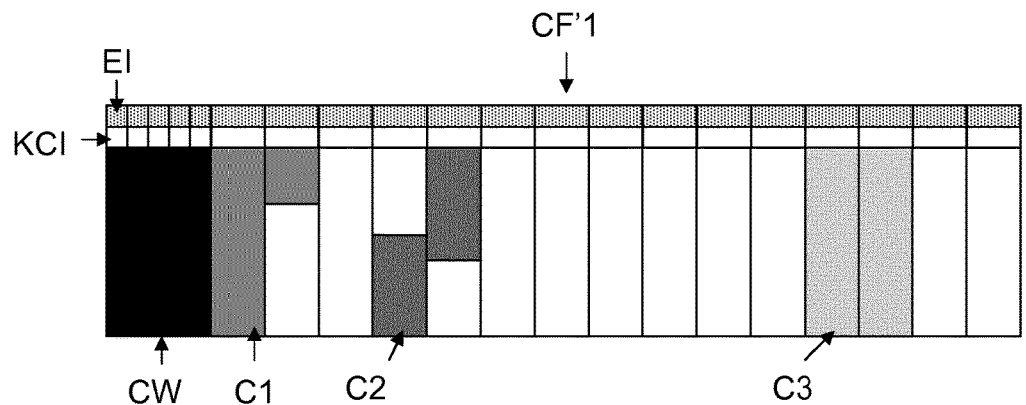

As illustrated in FIG. 11, an 8B/10B encoded sequence of 8 given bytes (6 valid data bytes, 1 control character and 1 invalid data byte), requiring 80 bits using 8B/10B, can be described in only 65 bits using 64B/65B coding. The leading bit L indicates that there is at least one special character describe in the following bytes. The first bit value (1) of the first byte indicates that there is at least one more special character described after this one. The following 3 bits of the first byte indicate the offset (001) of this special character in the initial byte sequence. The last 4 bits are the encoded value of the 8B/10B special character. For the second byte, the first bit value (0) indicates that there is no more special character described after this one. The following 3 bits of the second byte indicate the offset (100) of this special character in the initial byte sequence. The last 4 bits are the encoded value of the 8B/10B special character. As the second byte indicated that there is no more special characters in this 8 bytes sequence, the following 6 bytes are the 6 remaining bytes of the original sequence given in chronological order.

Figure 2:
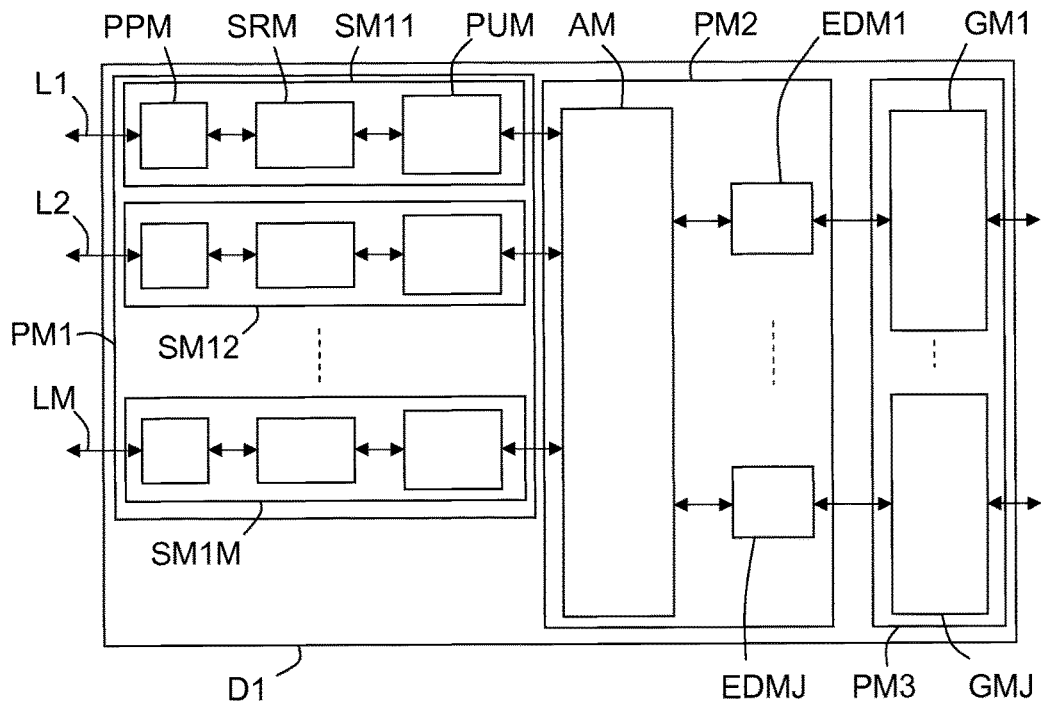

As illustrated in FIG. 2, this auxiliary 64B/65B encoding may be carried out by encoding/decoding means EDMj (j=1 to J) of the second processing means PM2.

In the third step (iii) of the first method, K or K+1 frame groups FGk are grouped together with a group descriptor GD according to grouping information, to produce a transport frame TF that must be transmitted by the transport network TN. This group descriptor GD defines initial arrangements of the initial digital data frames Fm that a frame group FGk comprises in a reduced format. In other words a group descriptor GD contains any information useful to a device Di to recover initial digital data frames Fm from a frame group FGk de-grouped from a transport frame TF. A transport frame TF is an optical data unit (ODU).

Figure 9:
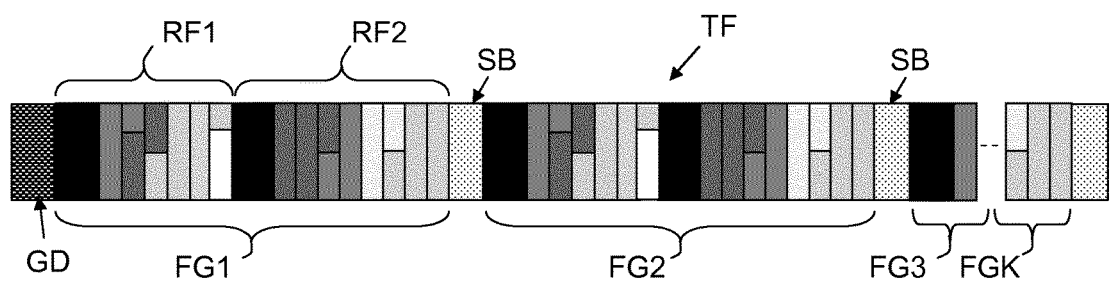

An example of transport frame TF is illustrated in FIG. 9. It comprises a group descriptor GD followed by the first frame group FG1 (here RF1+RF2), which is followed by stuffing bits SB, which are followed by the second frame group FG2, which is followed by stuffing bits SB, and so on till the last frame group FGK (but it could be also FGK+1). But it is possible to have several types of frame groups FGk on the same link (by the way one for CPRI and another one for Ethernet) with their own K values and their own group descriptor GD.

This third step (iii) may be carried out by a third processing means PM3 of the (processing) device Di. To this effect and as illustrated in FIG. 2, this third processing means PM3 may comprise at least one grouping means GM j (j=1 to J). Each one of the grouping means GMj (j=1 to J) offers an access to a part of the transport network TN (one grouping means GMj per physical link).

The second method according to the invention can be seen as a reverse method of the first method, i.e. a method allowing recovering of initial digital data frames Fm from a received transport frame TF.

More precisely, this second method comprises three steps (a), (b) and (c).

The first step (a) begins when the device Di receives a transport frame TF on a port connected to the transport network TN.

In this first step (a) the received transport frame TF (produced by a first method) is processed to de-group frame groups FGk it comprises.

This de-grouping being the reverse function of the frame group grouping, it can be carried out by the third processing means PM3 of the (processing) device Di, and more precisely by its grouping means GMj (j=1 to J).

In the second step (b) of the second method, each de-grouped frame group FGk is de-aggregated to get the reduced digital data frames RFm it comprises.

This de-aggregation being the reverse function of the reduced digital data frame aggregation, it can be carried out by the second processing means PM2 of the (processing) device Di, and more precisely by its aggregation means AM.

In case where the de-grouped frame groups FGk contain AxC containers encoded by means of the 64B/65B encoding, a 64B/65B decoding is applied to these AxC containers by the second processing means PM2 of the (processing) device Di, and more precisely by its encoding/decoding means EDMj, before the de-aggregation.

In the third step (c) of the second method, each de-aggregated reduced digital data frame RFm is un-compacted, then de-compressed if needed, and then upsized according to information contained into the group descriptor GD that was initially contained into the received transport frame TF to get (or recover) the initial digital data frames Fm.

This un-compacting being the reverse function of the compressed digital data frame compacting, it can be carried out by the first processing means PM1 of the (processing) device Di, and more precisely by its packing/unpacking means PUM. Moreover, the de-compression being the reverse function of the downsized digital data frame compression, it can be carried out by the first processing means PM1 of the (processing) device Di, and more precisely by its size reduction means SRM. More, the un-downsizing being the reverse function of the digital data frame downsizing, it can be carried out by the first processing means PM1 of the (processing) device Di, and more precisely by its pre-processing means PPM.

In case where the de-compressed digital data frames F'm are 8+2B digital data frames, a 8B/10B decoding is applied to them by the first processing means PM1 of the (processing) device Di, and more precisely by its pre-processing means PPM, before the un-downsizing.

The first PM1, second PM2 and third PM3 processing means of the device Di can be made of software modules, or of a combination of hardware and software modules. So, a device Di can be a computer program product that can be stored or used into a communication interface (or equipment).

The invention allows saving some connectivity (mainly optical fibers) and reducing transport bandwidth in the deployment of a transport network. Moreover, it allows reuse of an existing optical transport network instead of deploying new optical fibres.

The invention is not limited to the embodiments of processing methods and processing device described above, only as examples, but it encompasses all alternative embodiments which may be considered by one skilled in the art within the scope of the claims hereafter.

The invention claimed is:

1. A method for processing digital data frames to be transmitted by a transport network, said method comprising:
   downsizing digital data frames,
   compressing the downsized digital data frames wherein the compression comprises frequency down-sampling, scaling blocks of samples by a scaling factor and quantising the scaled blocks of samples to produce compressed samples and
   then compacting the compressed digital data frames to produce reduced digital data frames,
   aggregating at least some of the reduced digital data frames together according to aggregation information to produce frame groups, and
   grouping the frame groups being grouped together with a group descriptor, defining initial arrangements of said digital data frames, according to grouping information, to produce a transport frame to be transmitted by the transport network.

2. The method according to claim 1, wherein downsizing comprises reducing the line coding overhead of each digital data frame, while keeping errors of transmission.

3. The method according to claim 1, wherein the compacting comprises clearing from unused data bytes each one of the digital data frames.

4. The method according to claim 1, wherein, in case where said digital data frames have been encoded according to a 8B/10B line coding, transforming via a processor each one of the digital data frames into a couple of 8 data bits plus 2 control bits.

5. The method according to claim 1, further including applying a 64B/65B encoding to data containers contained into the frame groups before aggregating them into the transport frame.

6. The method according to claim 1, wherein the digital data frames are common public radio interface data frames.

7. The method according to claim 1, wherein the transport frame is an optical data unit configured for transport by an optical transport network.

8. A method for processing a transport frame transmitted by a transport network, said method comprising:
   receiving a transport frame produced by a process comprising:
      downsizing digital data frames,
      compressing the downsized digital data frames, wherein the compression comprises frequency down-sampling, scaling blocks of samples by a scaling factor and quantising the scaled blocks of samples to produce compressed samples and
      then compacting the compressed digital data frames to produce reduced digital data frames,
      aggregating at least some of the reduced digital data frames together according to aggregation information to produce frame groups, and
      grouping the frame groups being grouped together with a group descriptor, defining initial arrangements of said digital data frames, according to grouping information, to produce a transport frame to be transmitted by the transport network de-grouping frame groups it comprises,
   de-aggregating each of the frame groups to get reduced digital data frames they comprise, and un-compacting, then de-compressing if compressed, and then upsizing each one of the reduced digital data frames according to information contained into a group descriptor of the transport frame to get digital data frames.

9. The method according to claim 8, further comprising when the de-grouped frame groups contain data containers encoded using a 64B/65B encoding applying a 64B/65B decoding to the data containers.

10. The method according to claim 8, wherein, if the digital data frames are 8+2B digital data frames, transforming them into 8B/10B digital data frames after having de-compressed them.

11. The method according to claim 8, wherein the transport frame is an optical data unit transported by an optical transport network.

12. The method according to claim 8, wherein the digital data frames are common public radio interface data frames.

13. A device for processing digital data frames to be transmitted by a transport network, the processing device comprising:

a first processor comprising ports for receiving digital data frames and arranged for downsizing, then compressing, wherein the compression comprises frequency down-sampling, scaling blocks of samples by a scaling factor and quantising the scaled blocks of samples to produce compressed samples and then compacting the compressed digital data frames to produce reduced digital data frames, a second processor arranged for aggregating at least some of the reduced digital data frames together according to aggregation information to produce frame groups, and a third processor arranged for grouping the frame groups together with a group descriptor, defining initial arrangements of the digital data frames, according to grouping information, to produce a transport frame to be transmitted by the transport network.

14. The device according to claim 13, wherein the third processor is arranged, after having received a transport frame, for de-grouping the frame groups it comprises, the second processor is arranged for de-aggregating each of the frame groups to get reduced digital data frames they comprise, and the first processor is arranged for un-compacting, then de-compressing, and then un-downsizing each one of the reduced digital data frames according to information contained into the group descriptor of the transport frame to get digital data frames.

\* \* \* \* \*